(12) United States Patent
Mukherjee et al.

(10) Patent No.: US 10,822,972 B2
(45) Date of Patent: Nov. 3, 2020

(54) COMPLIANT SHROUD FOR GAS TURBINE ENGINE CLEARANCE CONTROL

(71) Applicant: General Electric Company, Schenectady, NY (US)

(72) Inventors: Yu Mukherjee, West Chester, OH (US); Ananda Barua, Schenectady, NY (US); Changjie Sun, Clifton Park, NY (US); Wenfeng Lu, West Chester, OH (US)

(73) Assignee: General Electric Company, Schenectady, NY (US)

( * ) Notice: Subject to any disclaimer, the term of this patent is extended or adjusted under 35 U.S.C. 154(b) by 639 days.

(21) Appl. No.: 14/962,364

(22) Filed: Dec. 8, 2015

(65) Prior Publication Data

US 2017/0159463 A1 Jun. 8, 2017

(51) Int. Cl.
*F01D 9/04* (2006.01)
*F01D 11/16* (2006.01)
(Continued)

(52) U.S. Cl.
CPC .............. *F01D 9/04* (2013.01); *F01D 11/005* (2013.01); *F01D 11/12* (2013.01); *F01D 11/16* (2013.01); *F01D 25/24* (2013.01); *F01D 25/246* (2013.01); *F02C 3/04* (2013.01); *F02C 7/36* (2013.01); *F04D 29/524* (2013.01); *F04D 29/526* (2013.01); *F05D 2220/32* (2013.01);
(Continued)

(58) Field of Classification Search
CPC .......... F01D 9/04; F01D 9/042; F01D 11/001; F01D 11/005; F01D 11/08; F01D 11/12; F01D 11/24; F01D 11/16; F01D 25/24; F01D 25/246; F01D 25/28; F01D 25/12; F02C 3/04; F02C 7/36; F05D 2220/32; F05D 2240/11; F05D 2240/307; F05D 2240/35; F05D 2250/75; F05D 2260/50
USPC .......................................................... 60/805
See application file for complete search history.

(56) References Cited

U.S. PATENT DOCUMENTS

| | | |
|---|---|---|
| 3,042,365 A | 7/1962 | Curtis et al. |
| 3,085,398 A | 4/1963 | Ingleson |

(Continued)

FOREIGN PATENT DOCUMENTS

| | | |
|---|---|---|
| DE | 10 2008 007321 A1 | 8/2009 |
| EP | 1 408 200 A2 | 4/2004 |

(Continued)

OTHER PUBLICATIONS

Extended European Search Report and Opinion issued in connection with corresponding EP Application No. 16200869.2 dated Apr. 13, 2017.

*Primary Examiner* — Jesse S Bogue
*Assistant Examiner* — Loren C Edwards
(74) *Attorney, Agent, or Firm* — Hanley, Flight & Zimmerman, LLC (57) ABSTRACT

The present disclosure is directed to a shroud assembly for a gas turbine. The shroud assembly includes a casing and a shroud. The shroud includes a radially outer wall engaged with the casing. A radially inner wall integrally couples to the radially outer wall. The radially inner wall and the radially outer wall collectively define a pair of axially opposed cavities. The radially inner wall moves radially outward toward the casing when one or more gas turbine blades contact the radially inner wall.

18 Claims, 7 Drawing Sheets

(51) Int. Cl.
  *F01D 25/24* (2006.01)
  *F01D 11/12* (2006.01)
  *F01D 11/00* (2006.01)
  *F02C 3/04* (2006.01)
  *F02C 7/36* (2006.01)
  *F04D 29/52* (2006.01)

(52) U.S. Cl.
  CPC .... *F05D 2240/11* (2013.01); *F05D 2240/307* (2013.01); *F05D 2240/35* (2013.01); *F05D 2250/75* (2013.01); *F05D 2260/50* (2013.01)

(56) References Cited

U.S. PATENT DOCUMENTS

| | | | |
|---|---|---|---|
| 3,842,597 A * | 10/1974 | Ehrich | F02C 7/141 |
| | | | 60/226.1 |
| 4,251,987 A * | 2/1981 | Adamson | F02C 3/113 |
| | | | 417/405 |
| 4,897,021 A | 1/1990 | Chaplin et al. | |
| 5,035,573 A | 7/1991 | Tseng et al. | |
| 5,049,033 A | 9/1991 | Corsmeier et al. | |
| 5,056,988 A | 10/1991 | Corsmeier et al. | |
| 5,116,199 A | 5/1992 | Ciokajlo | |
| 5,344,284 A * | 9/1994 | Delvaux | F01D 11/22 |
| | | | 415/173.2 |
| 5,456,576 A * | 10/1995 | Lyon | F01D 5/20 |
| | | | 415/173.3 |
| 7,189,057 B2 * | 3/2007 | Lee | F01D 11/16 |
| | | | 415/128 |
| 7,210,899 B2 | 5/2007 | Wilson, Jr. | |
| 7,596,954 B2 | 10/2009 | Penda et al. | |
| 8,292,571 B2 | 10/2012 | Ballard, Jr. et al. | |
| 8,342,798 B2 | 1/2013 | Floyd, II et al. | |
| 8,434,997 B2 | 5/2013 | Pinero et al. | |
| 8,678,742 B2 | 3/2014 | Klingels | |
| 9,115,595 B2 * | 8/2015 | Snook | F01D 11/24 |
| 2006/0067815 A1 * | 3/2006 | Ghasripoor | F04D 29/126 |
| | | | 415/170.1 |
| 2010/0034645 A1 | 2/2010 | Mulcaire et al. | |
| 2013/0017057 A1 * | 1/2013 | Lagueux | F01D 11/08 |
| | | | 415/1 |
| 2015/0098829 A1 | 4/2015 | Baldiga et al. | |

FOREIGN PATENT DOCUMENTS

| | | |
|---|---|---|
| EP | 2 546 469 A2 | 1/2013 |
| WO | 2010/103213 A1 | 9/2010 |

* cited by examiner

COMPLIANT SHROUD FOR GAS TURBINE ENGINE CLEARANCE CONTROL

FIELD OF THE INVENTION

The present subject matter relates generally to a shroud assembly for a gas turbine engine. More particularly, the present subject matter relates to a shroud assembly for a compressor section or a turbine section in a gas turbine engine having a shroud that moves radially outward upon contact with a rotor blade.

BACKGROUND OF THE INVENTION

A gas turbine engine generally includes, in serial flow order, a compressor section, a combustion section, a turbine section, and an exhaust section. In operation, air enters an inlet of the compressor section where one or more axial compressors progressively compress the air until it reaches the combustion section. Fuel mixes with the compressed air and burns within the combustion section, thereby creating combustion gases. The combustion gases flow from the combustion section through a hot gas path defined within the turbine section and then exit the turbine section via the exhaust section.

In particular configurations, the compressor section includes, in serial flow order, a high pressure (HP) compressor and a low pressure (LP) compressor. Similarly, the turbine section includes, in serial flow order, a high pressure (HP) turbine and a low pressure (LP) turbine. The HP compressor, LP compressor, HP turbine, and LP turbine include a one or more axially spaced apart rows of circumferentially spaced apart rotor blades. Each rotor blade includes a rotor blade tip. One or more shrouds may be positioned radially outward from and circumferentially enclose the rotor blades. It is generally desirable to minimize the clearance gap between the one or more shrouds and the rotor blade tips to minimize leakage of air or combustion products therethrough. If the clearance gap is too small, however, there is a risk that the rotor blades may rub against the shrouds, which may result in decreased gas turbine efficiency.

Conventionally, pneumatic or hydraulic systems may permit the shroud to move radially outward if one or more of the rotor blades contact the shroud, thereby preventing further rubbing. Nevertheless, these conventional systems are complex and add significant cost and weight to the gas turbine. Accordingly, a shroud for a gas turbine that moves radially outward upon contact with a rotor blade and does not require a pneumatic or hydraulic system to provide such movement would be welcomed in the technology.

BRIEF DESCRIPTION OF THE INVENTION

Aspects and advantages of the invention will be set forth in part in the following description, or may be obvious from the description, or may be learned through practice of the invention.

The shroud assembly disclosed herein includes a shroud that moves radially outwardly upon contact with one or more rotor blades without the assistance of pneumatic or hydraulic systems. In this respect, the shroud assembly disclosed herein provides the minimized gap between the shroud and the adjacent rotor blade tips that conventional hydraulically- or pneumatically-actuated shroud assemblies provide, but without the additional weight and cost associated therewith.

In one aspect, the present disclosure is directed to a shroud assembly for a gas turbine. The shroud assembly includes a casing and a shroud. The shroud includes a radially outer wall engaged with the casing. A radially inner wall integrally couples to the radially outer wall. The radially inner wall and the radially outer wall collectively define a pair of axially opposed cavities. The radially inner wall moves radially outward toward the casing when one or more gas turbine blades contact the radially inner wall.

Another aspect of the present disclosure is directed to a gas turbine. The gas turbine includes a compressor having a compressor casing and a plurality of compressor blades, a combustion section, and a turbine having a turbine casing and a plurality of turbine blades. A shaft rotatably couples the compressor and the turbine. A shroud for the compressor or the turbine includes a radially outer wall engaged with the compressor casing or the turbine casing. A radially inner wall integrally couples to the radially outer wall. The radially inner wall and the radially outer wall collectively define a pair of axially opposed cavities. The radially inner wall moves radially outward toward the compressor casing or the turbine casing when one or more of the plurality of compressor blades or the plurality of turbine blades contact the radially inner wall.

In a further aspect, the present disclosure is directed to a shroud assembly for a gas turbine. The shroud assembly includes a casing and a shroud. The shroud includes a radially outer wall having a first flange engaged with the casing. The first flange includes a first plurality of fingers. A second flange engages with the casing and includes a second plurality of fingers. A radially inner wall couples to first plurality of fingers and the second plurality of fingers. The radially inner wall is positioned radially inward from the first flange and the second flange. The radially outer wall and the radially inner wall collectively define a pair of axially opposed cavities. The first plurality of fingers and the second plurality of fingers pivot radially outward to move the shroud wall radially outward toward the casing when one or more gas turbine blades contact the shroud wall.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of a turbine shroud incorporated into a turbofan jet engine for purposes of illustration, one of ordinary skill in the art will readily appreciate that embodiments of the present invention may be applied to any turbine incorporated into any turbomachine and are not limited to a gas turbofan jet engine unless specifically recited in the claims.

Figure 1:
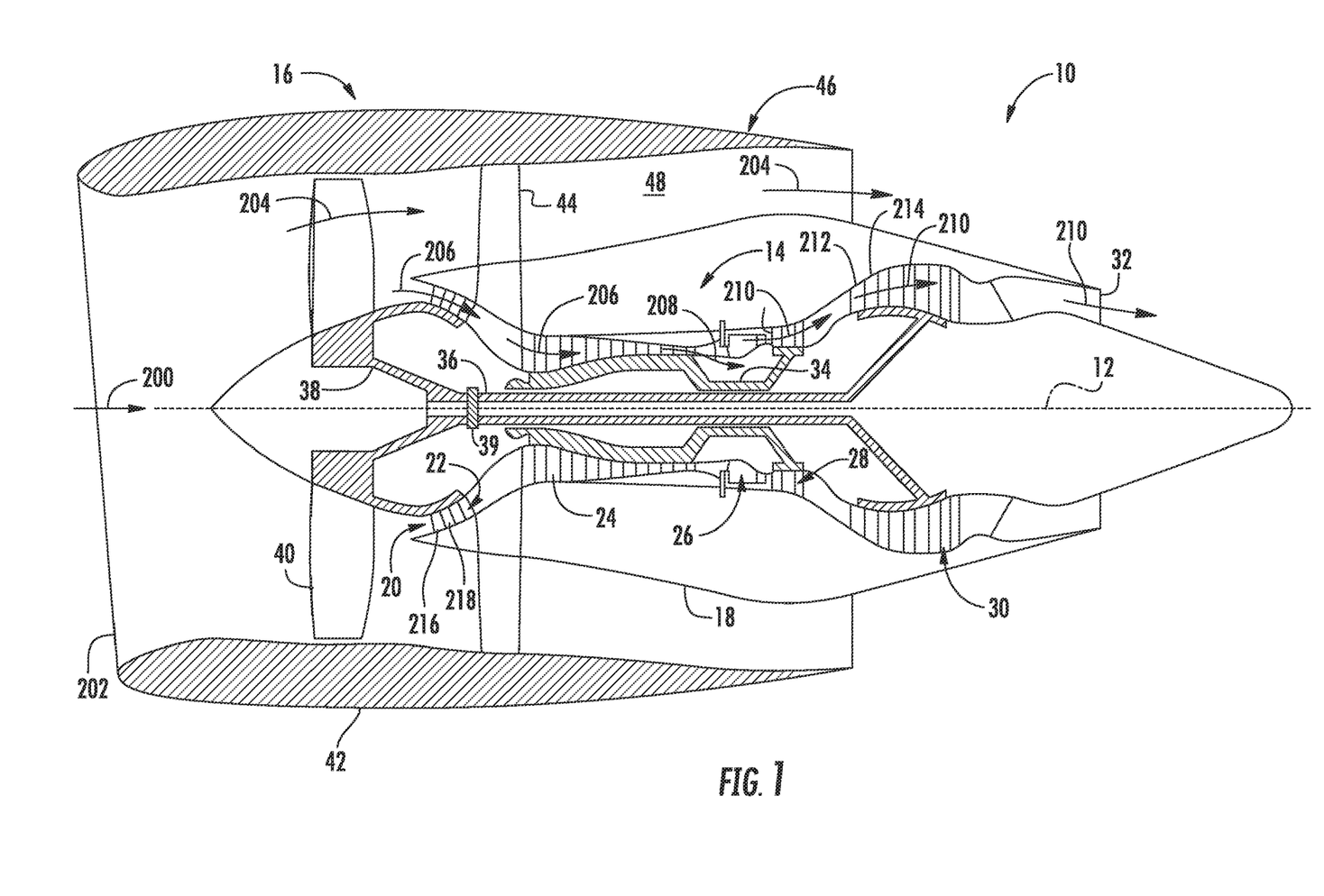
FIG. 1 is a schematic cross-sectional view of an exemplary high bypass turbofan jet engine in accordance with the embodiments disclosed herein.

Referring now to the drawings, wherein identical numerals indicate the same elements throughout the figures, FIG. 1 is a schematic cross-sectional view of an exemplary, high-bypass turbofan-type gas turbine engine 10 ("turbofan 10"), which may incorporate various embodiments disclosed herein. As shown in FIG. 1, the turbofan 10 has a longitudinal or axial centerline axis 12 extending therethrough for reference purposes. In general, the turbofan 10 may include a core turbine or gas turbine engine 14 disposed downstream from a fan section 16.

The gas turbine engine 14 may generally include a substantially tubular outer casing 18 that defines an annular inlet 20. The outer casing 18 may be formed from multiple casings. The outer casing 18 encases, in serial flow relationship, a compressor section having a booster or low pressure (LP) compressor 22 and a high pressure (HP) compressor 24, a combustion section 26, a turbine section having a high pressure (HP) turbine 28 and a low pressure (LP) turbine 30, and a jet exhaust nozzle section 32. A high pressure (HP) shaft or spool 34 drivingly couples the HP turbine 28 and the HP compressor 24. A low pressure (LP) shaft or spool 36 drivingly couples the LP turbine 30 and the LP compressor 22. The LP spool 36 may also couple to a fan spool or shaft 38 of the fan section 16. In some embodiments, the LP spool 36 may couple directly to the fan spool 38 (i.e., a direct-drive configuration). In other embodiments like the one shown in FIG. 1, the LP spool 36 may connect to the fan spool 38 via a reduction gear 39 (i.e., an indirect-drive or geared-drive configuration).

As shown in FIG. 1, the fan section 16 includes a plurality of fan blades 40 coupled to and extending radially outwardly from the fan spool 38. An annular fan casing or nacelle 42 circumferentially encloses the fan section 16 and/or at least a portion of the gas turbine engine 14. A plurality of circumferentially-spaced outlet guide vanes 44 may support the nacelle 42 relative to the gas turbine engine 14. Moreover, a downstream section 46 of the nacelle 42 may extend over an outer portion of the gas turbine engine 14 to define a bypass airflow passage 48 therebetween.

Figure 2:
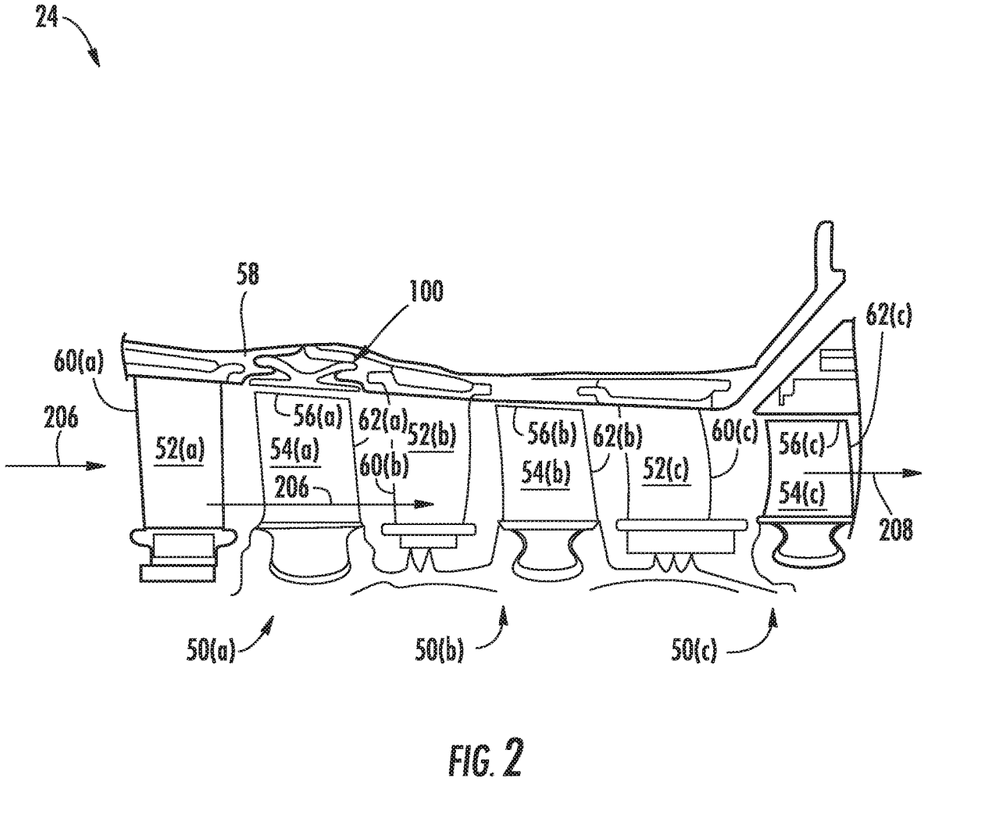
FIG. 2 is a cross-sectional side view of a high pressure compressor of the gas turbine engine shown in FIG. 1, illustrating the location of a shroud assembly therein.

FIG. 2 is an enlarged cross-sectional side view of the HP compressor 24 shown in FIG. 1, which may incorporate various embodiments disclosed herein. As shown in FIG. 2, the HP compressor 24 may include three compressor stages 50. For example, the HP compressor 24 may include, in serial flow order, a first stage 50(*a*), a second stage 50(*b*), and a third stage 50(*c*). Although, the total number of compressor stages 50 may be more or less than three as is necessary or desired.

As shown in FIG. 2, each stage 50(*a-c*) includes corresponding rows 60(*a*), 60(*b*), 60(*c*) of circumferentially spaced apart compressor stator vanes 52(*a*), 52(*b*), and 52(*c*) and corresponding rows 62(*a*), 62(*b*), 62(*c*) of circumferentially spaced of compressor rotor blades 54(*a*), 54(*b*), and 54(*c*). The rows 60(*a-c*) of stator vanes 52(*a-c*) and the rows 62(*a-c*) of rotor blades 54(*a-c*) are axially spaced along the HP shaft 34 (FIG. 1). The rotor blades 54(*a-c*) couple to the HP shaft 34 and extend radially outwardly from the HP shaft 34 to corresponding blade tip 56(*a*), 56(*b*), and 56(*c*). The stator vanes 52(*a-c*) remain stationary relative to the rotor blades 54(*a-c*) during operation of the turbofan 10.

A casing or shell 58 circumferentially surrounds the rows 60(*a-c*) of the stator vanes 52(*a-c*) and the rows 62(*a-c*) of the rotor blades 54(*a-c*). The casing 58 may be a unitary (i.e., a single casing for the entire HP compressor 24). Alternately, the casing 58 may be segmented such that each segment of the casing 58 surrounds, e.g., a portion of one of the rows 62(*a-c*) of rotor blades 54(*a-c*), one of the rows 62(*a-c*) of rotor blades 54(*a-c*), or one compressor stages 50(*a-c*).

The HP compressor 24 may also include one or more shroud assemblies 100 that couple to the casing 58. For the purposes of clarity, only one shroud assembly 100 corresponding to the row 62(*a*) of rotor blades 54(*a*) is shown in FIG. 2. Nevertheless, additional shrouds assemblies 100 may correspond to the rows 62(*b-c*) of rotor blades 54(*b-c*). The shroud assembly 100 is radially spaced from the blade tips 56(*a*) of the rotor blades 54(*a*) to form a clearance gap therebetween. It is generally desirable to minimize the clearance gap between the blade tips 56(*a*) and the shroud assembly 100, particularly during cruising operation of the turbofan 10, to reduce leakage over the blade tip 56(*a*) and through the clearance gap. As will be discussed in greater detail below, the shroud assembly 100 may move radially outward relative to the casing 58 if one of the rotor blades 54(a) contacts the shroud assembly 100. In this respect, the shroud assembly 100 may be positioned closer to the blade tip 56(a) than many conventional shrouds, thereby minimizing the clearance gap.

Figure 3:
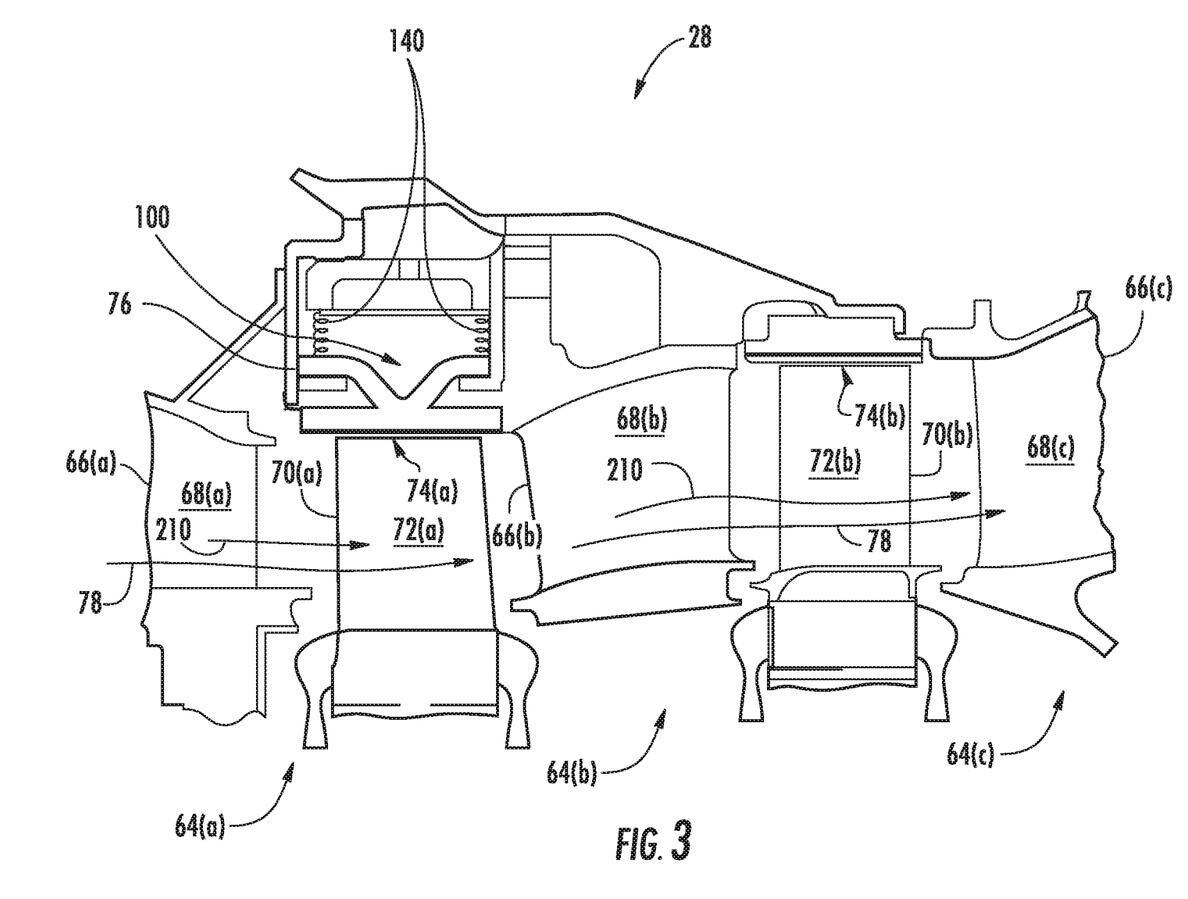
FIG. 3 is a cross-sectional side view of a high pressure turbine of the gas turbine engine shown in FIG. 1, illustrating the location of the shroud assembly therein.

FIG. 3 is an enlarged cross-sectional side view of the HP turbine 26 shown in FIG. 1, which may incorporate various embodiments disclosed herein. As shown in FIG. 3, the HP turbine 26 may include three turbine stages 64. For example, the HP turbine 26 may include, in serial flow order, a first stage 64(a), a second stage 64(b), and a third stage 64(c). Although, the total number of turbine stages 64 may be more or less than three as is necessary or desired.

As shown in FIG. 3, each stage 64(a-c) includes corresponding rows 66(a), 66(b), 66(c) of circumferentially spaced apart turbine stator vanes 68(a), 68(b), and 68(c) and corresponding rows 70(a) and 70(b) of circumferentially spaced of turbine rotor blades 72(a) and 72(b). The rows 66(a-c) of stator vanes 52(a-c) and the rows 70(a-b) of rotor blades 72(a-b) are axially spaced along the HP shaft 34 (FIG. 1). Although not shown in FIG. 3, the third stage 64(c) may include a row of rotor blades. The rotor blades 72(a-b) couple to the HP shaft 34 and extend radially outwardly from the HP shaft 34 to a corresponding blade tip 74(a) and 74(b). The stator vanes 68(a-c) remain stationary relative to the rotor blades 72(a-b) during operation of the turbofan 10. In this respect, the stator vanes 68(a-c) and the rotor blades 72(a-c) at least partially define a hot gas path 78 for routing combustion gases from the combustion section 26 (FIG. 1) through the HP turbine 28.

A casing or shell 76 circumferentially surrounds the rows 66(a-c) of stator vanes 68(a-c) and the rows 70(a-b) of rotor blades 72(a-c). The casing 76 may be a unitary (i.e., a single casing for the entire HP turbine 26). Alternately, the casing 76 may be segmented such that each segment of the casing 76 surrounds, e.g., a portion of one of the rows 70(a-b) of rotor blades 72(a-b), one of the rows 70(a-b) of rotor blades 72(a-b), or one turbine stages 64(a-c).

The HP compressor 24 may also include one or more shroud assemblies 100 assemblies that couple to the casing 76. For the purposes of clarity, only one shroud assembly 100 corresponding to the row 70(a) of rotor blades 72(a) is shown in FIG. 3. Nevertheless, additional shroud assemblies 100 may correspond to the row 70(b) of rotor blades 72(b). The shroud assembly 100 is radially spaced from the blade tips 74(a) of the rotor blades 72(a) to form a clearance gap therebetween. It is generally desirable to minimize the clearance gap between the blade tips 74(a) and the shroud assembly 100 to reduce leakage from the hot gas path 78 over the blade tip 74(a) and through the clearance gap. As will be discussed in greater detail below, the shroud assembly 100 may move radially outward relative to the casing 76 if one of the rotor blades 72(a) contacts the shroud assembly 100. In this respect, the shroud assembly 100 may be positioned closer to the blade tip 74(a) than conventional shrouds, thereby minimizing the clearance gap.

As illustrated in FIG. 1, air 200 enters an inlet portion 202 of the turbofan 10 during operation thereof. A first portion 204 of the air 200 flows into the bypass flow passage 48, and a second portion 206 of the air 200 flows into the inlet 20 of the LP compressor 22.

The second portion 206 of the air 200 flows through LP compressor 22 where sequential stages of LP compressor stator vanes 216 and LP compressor rotor blades 218 coupled to the LP shaft 36 progressively compress the second portion 206 of air 200 flowing therethrough en route to the HP compressor 24. The stator vanes 52(a-c) and turbine rotor blades 54(a-c) in the HP compressor 24 further compress the second portion 206 of the air 200 flowing therethrough. In this respect, HP turbine 24 provides compressed air 208 to the combustion section 26 where it mixes with fuel and burns to provide combustion gases 210.

The combustion gases 210 flow through the HP turbine 28 where the stator vanes 68(a-c) and turbine rotor blades 72(a-b) extract a first portion of kinetic and/or thermal energy from the combustion gases 210. This energy extraction supports operation of the HP compressor 24. The combustion gases 210 then flow through the LP turbine 30 where sequential stages of LP turbine stator vanes 212 and LP turbine rotor blades 214 coupled to the LP shaft 36 extract a second portion of thermal and kinetic energy from the combustion gases 210. This energy extraction causes the LP shaft 36 to rotate, thereby supporting operation of the LP compressor 22 and/or rotation of the fan spool or shaft 38. The combustion gases 210 then exit the gas turbine engine 14 via the jet exhaust nozzle section 32.

Along with a turbofan 10, a core turbine 14 serves a similar purpose and sees a similar environment in land-based gas turbines, turbojet engines in which the ratio of the first portion of air 204 to the second portion of air 206 is less than that of a turbofan, and unducted fan engines in which the fan section 16 is devoid of the nacelle 42. In each of the turbofan, turbojet, and unducted engines, a speed reduction device (e.g., the reduction gearbox 39) may be included between any shafts and spools. For example, the reduction gearbox 39 may be disposed between the LP spool 36 and the fan shaft 38 of the fan section 16.

Multiple embodiments of the shroud assembly 100 will be described below as positioned adjacent to the row 70(a) of turbine rotor blades 72(a) in the HP turbine 28. Nevertheless, the various embodiments of the shroud assembly 100 may be positioned adjacent to any row of turbine rotor blades in the HP turbine 28. Furthermore, the various embodiments of the shroud assembly 100 may also be positioned the LP turbine 30, the LP compressor 22, and/or the HP compressor 24.

Figure 4:
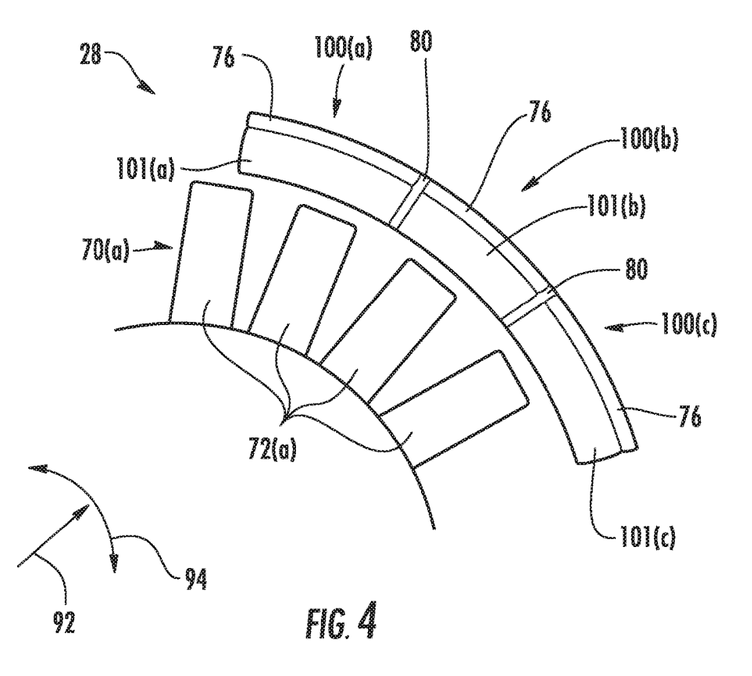
FIG. 4 is a front view of a portion of one row of turbine rotor blades, illustrating a plurality of shroud assemblies circumferentially enclosing the portion of the row of turbine rotor blades.
Figure 5:
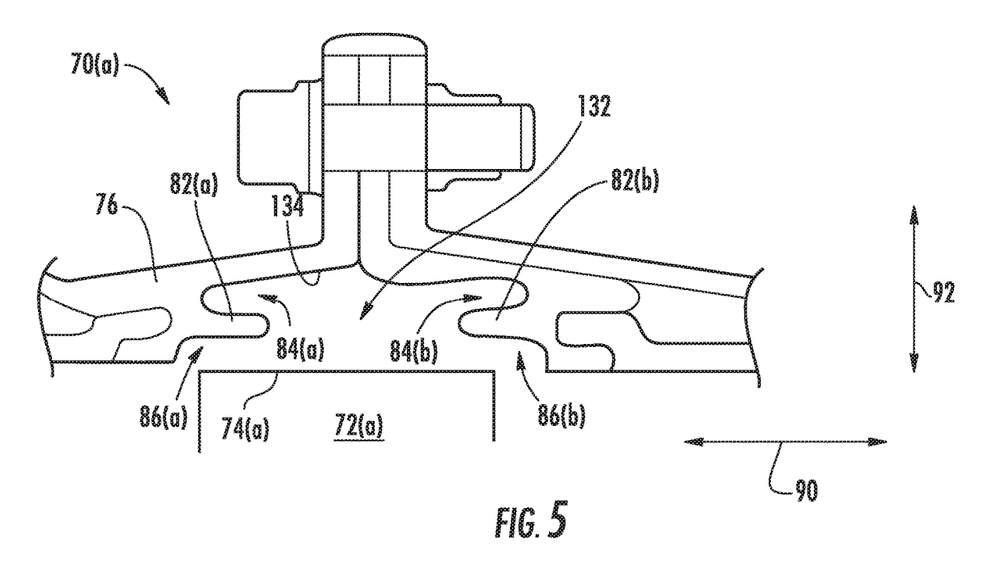
FIG. 5 is an cross-sectional side view of a turbine casing, illustrating the features thereof.
Figure 6:
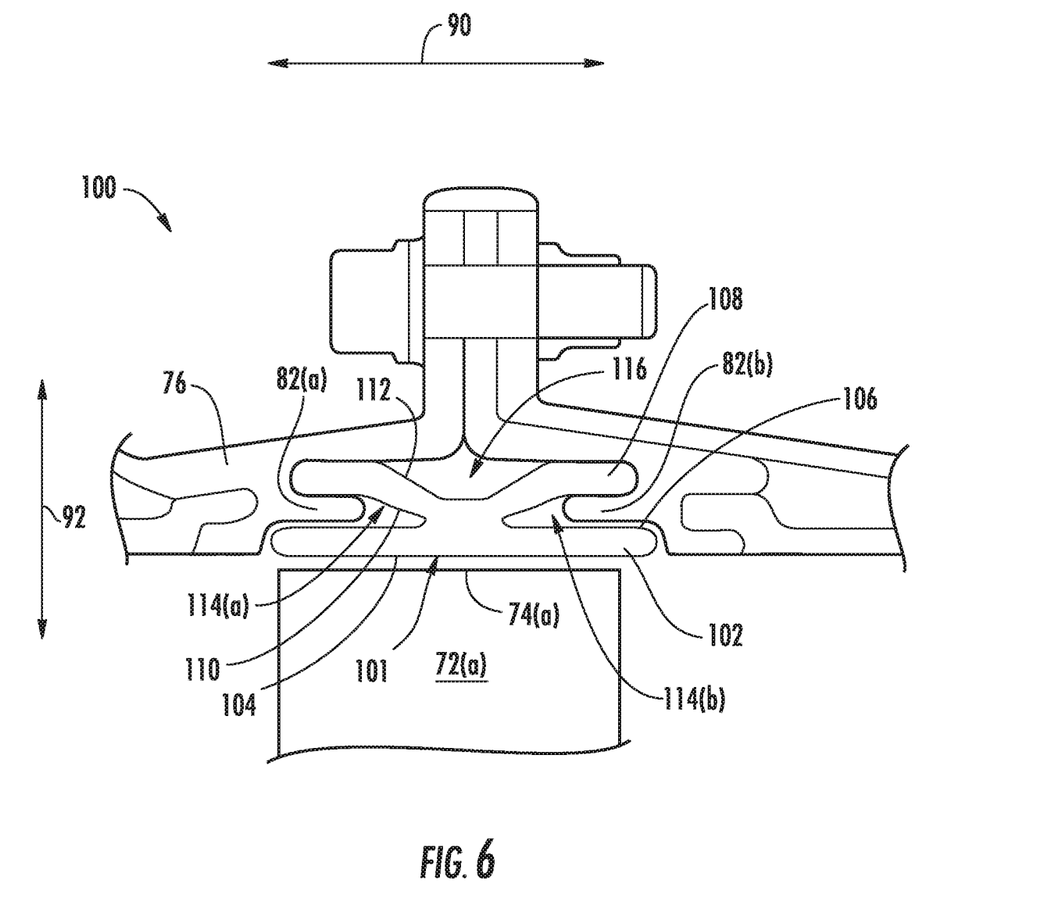
FIG. 6 is a cross-sectional side view of one embodiment of the shroud assembly as disclosed herein.

FIGS. 4-6 illustrate a first embodiment of the shroud assembly 100. More specifically, FIG. 4 is a front view of a portion of the row 70(a) of turbine rotor blades 72(a), illustrating a plurality of shroud assemblies 100 circumferentially enclosing the portion of the row 70(a) of turbine rotor blades 72(a). FIG. 5 is a cross-sectional side view of the turbine casing 76, illustrating the various features thereof. FIG. 6 is a cross-sectional side view of one embodiment the shroud assembly 100, illustrating the various features thereof.

As illustrated in FIGS. 4-6, the shroud assembly 100 defines an axial direction identified by an arrow 90, a radial direction identified by an arrow 92, and a circumferential direction identified by an arrow 94. In general, the axial direction extends along the longitudinal axis 12, the radial direction extends orthogonally outward from the longitudinal axis 12, and the circumferential direction extends concentrically around the longitudinal axis 12.

FIG. 4 illustrates a plurality of the shroud assemblies 100(a), 100(b), 100(c) circumferentially enclosing the row 70(a) of turbine rotor blades 72(a) in the HP turbine 28. Although only a ninety degree portion of the row 70(a) is shown for clarity, it should be appreciated that additional shroud assemblies 100 may circumferentially enclose the remaining 270 degrees of the row 70(a) as well. As illustrated in FIG. 4, the shroud assemblies 100 are axially aligned and positioned every thirty degrees (i.e., three shroud assemblies 100(a), 100(b), 100(c) in a ninety degrees portion of the row 70(a).). In this respect, the twelve shroud assemblies 100 may circumferentially enclose the row 70(a); although, more or less shroud assemblies 100 may enclose the row 70(a) as is necessary or desired. Each of the shroud assemblies 100(a), 100(b), and 100(c) is circumferentially spaced apart from the adjacent shroud assembly 100. In this respect, a seal 80 may be positioned between each of the shroud assemblies 100(a), 100(b), and 100(c) to prevent the combustion gases 210 from escaping the hot gas path 78.

As will be discussed in greater detail below, the shroud assembly 100 includes a shroud 101 having a radially inner wall 102. Each of radially inner walls 102 of the shrouds 101 of the shroud assemblies 100(a), 100(b), and 100(c) are independently radially moveable relative to the turbine casing 76. For example, the radially inner wall 102 of the shroud assembly 100(a) may move radially outward upon contact with one or more of the turbine blades 72(a), while the radially inner wall 102 of the shroud assembly 100(b) remains stationary.

As illustrated in FIG. 5, the turbine casing 76 defines a shroud receiving cavity 132 for receiving and positioning the shroud 101 of the shroud assembly 100. The shroud receiving cavity 132 is generally axially aligned with and positioned radially outward from the row 70(a) of turbine blades 72(a). The turbine casing 76 includes a first casing boss 82(a) and a second casing boss 82(b), which extend axially inwardly into the shroud receiving cavity 132 from opposite sides thereof. In this respect, the first and the second casing bosses 82(a), 82(b) respectively define a first slot 84(a) and a second slot 84(b) positioned radially outwardly from the first and the second casing bosses 82(a), 82(b). Furthermore, the first and the second casing bosses 82(a), 82(b) respectively define a first cavity portion 86(a) and a second cavity portion 86(b) positioned radially inwardly from the first and the second casing bosses 82(a), 82(b).

FIG. 6 illustrates the shroud 101 positioned in the shroud receiving cavity 132 of the turbine casing 76. More specifically, the shroud 101 includes a radially inner wall 102 having a radially inner surface 104 and a radially outer surface 106. Portions of the radially inner wall 102 are positioned in the first and second cavity portions 86(a), 86(b). In this respect, the radially outer surface 104 is adjacent to, but radially spaced apart from, the first and the second casing bosses 82(a), 82(b), and the radially inner surface 106 is adjacent to the turbine rotor blades 72(a). The radially inner surface 104 and the radially outer surface 106 are curved in the circumferential direction 94 and planar in the axial direction 90.

The shroud 101 also includes a radially outer wall 108 having a radially inner surface 110 and a radially outer surface 112. An axially central portion of the radially inner surface 110 of the radially outer wall 108 integrally couples to an axially central portion of the radially outer surface 106 of the radially inner wall 102. The axially outer ends of the radially outer wall 108 are positioned in the first and second slots 84(a), 84(b), which are sized to secure the radially outer wall 108 therein. That is, the radially outer wall 108 engages with or couples to the turbine casing 76. Alternately, one or more springs 140 (FIG. 3) may secure the radially outer wall 108 in the first and second slots 84(a), 84(b). Like the radially inner wall 102, the radially outer wall 108 is curved in the circumferential direction 94. With respect to the axial direction 90, however, the radially outer wall 108 is arcuate shaped. In this respect, the axially outer ends of the radially outer wall 108 curve radially inward to the axially central portion, which integrally couples to the radially inner wall 102. As such, the axially outer ends of the radially outer wall 108 are positioned radially outward from the axially central portion thereof.

The radially inner wall 102 and the radially outer wall 108 collectively define a first cavity 114(a) and a second cavity 114(b) axially spaced apart from the first cavity 114(a). The first and second casing bosses 82(a), 82(b) are positioned in the first and second cavities 114(a), 114(b). As will be discussed in greater detail below, the first and second cavities 114(a), 114(b) provide clearance for the radially inner wall 102 to move radially outward upon contact with one or more of the turbine blades 74(a).

The radially outer wall 108 and the turbine casing 76 collectively define a cavity 116. The cavity 116 provides clearance for the axially central portion of the radially outer wall 108 to move radially outward when one or more of the turbine blades 74(a) contact the radially inner wall 102.

During operation of the turbofan 10, the shroud 101 moves radially outwardly upon contact with one or more of the turbine blades 74(a). This radial movement prevents erosion of the shroud 101 and/or the turbine blades 72(a), which could widen the gap between the shroud 101 and the turbine blade tips 74(a) and reduce the efficiency of the turbofan 10. More specifically, when one or more turbine blades 74(a) contact the radially inner surface 104 of the radially inner wall 102, the radially outer wall 108 compresses and moves radially outwardly, thereby shrinking the cavity 116. This moves the radially inner wall 102 radially outwardly toward the turbine casing 76 to minimize the forces exerted thereon by the one or more turbine blades 74(a), thereby preventing the aforementioned erosion. The radially spaced apart relationship between the radially outer surface 106 of the radially inner wall 102 and the first and second casing bosses 82(a), 82(b) provide clearance to accommodate the radial movement of the radially inner wall 102. This radially outward movement also shrinks the cavities 114(a), 114(b).

When the one or more turbine blades 72(a) in contact with the radially inner wall 104 move out of contact therewith, the shroud 101 returns to its pre-contact configuration. More specifically, the radially outer wall 108 expands and moves radially inwardly, thereby enlarging the cavity 116 to its pre-contact size. This moves the radially inner wall 102 radially inwardly away from the turbine casing 76 and back to its pre-contact position. In this respect, the cavities 114(a), 114(b) also expand to their pre-contact sizes.

The shroud 101 is preferably constructed from a suitable nickel or cobalt alloys. Suitable nickel and cobalt alloys include WASPALOY® alloys produced by United Technologies Corporation of Hartford, Conn., USA and INCONEL® alloys produced by Special Metal Corporation of New Hartford, N.Y., USA. Although, any suitable material may be used to construct the shroud 101.

Figure 7:
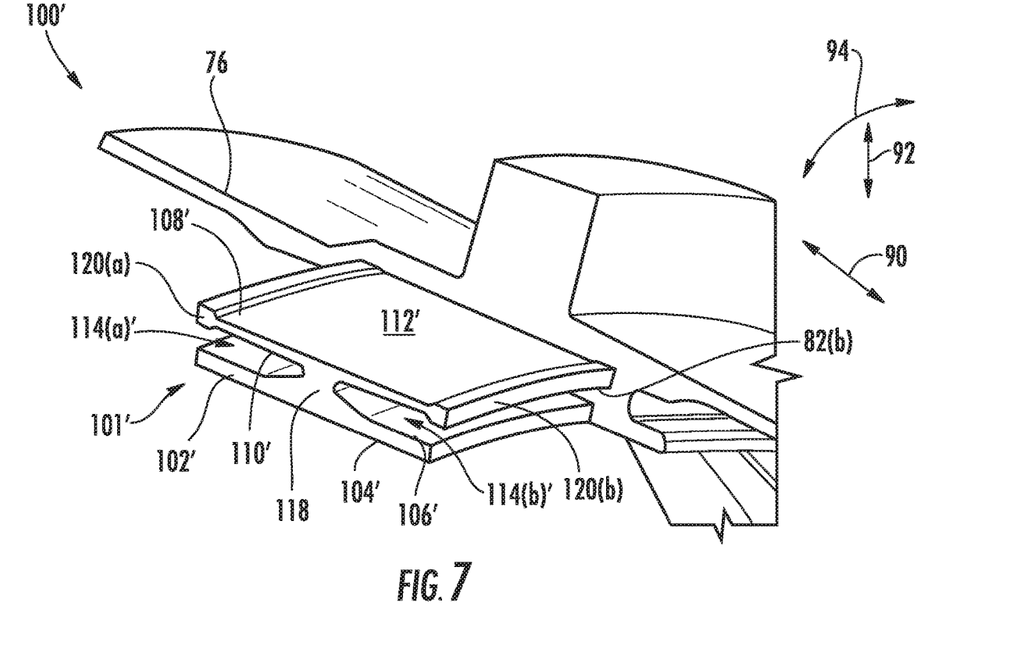
FIG. 7 is a cross-sectional side view of an alternate embodiment of the shroud assembly as disclosed herein.
Figure 8:
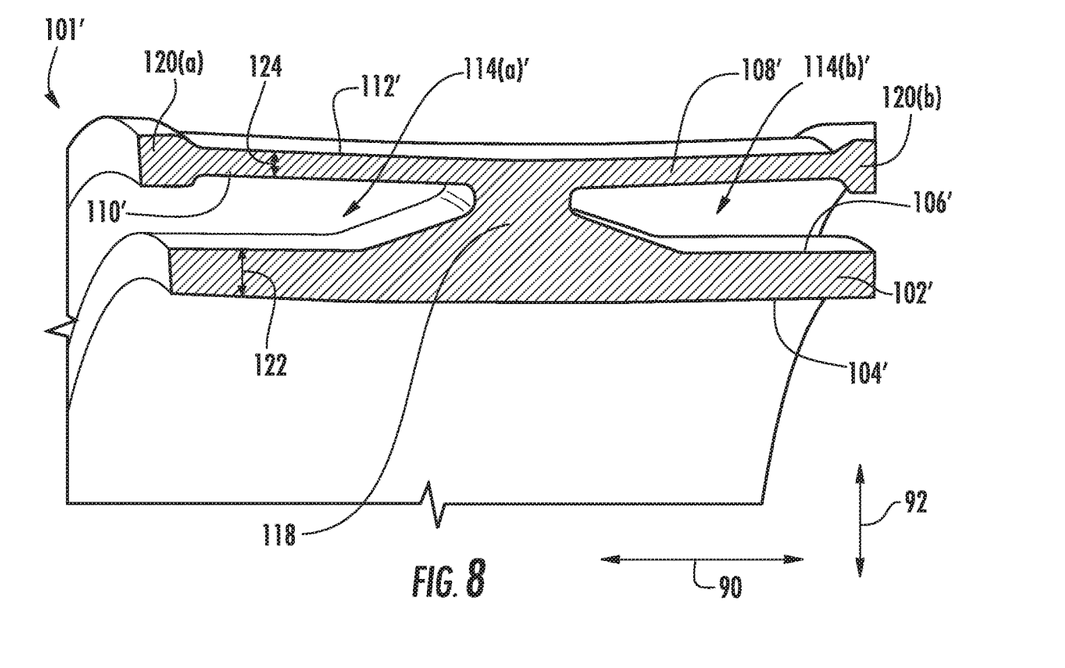
FIG. 8 is an alternate cross-sectional side view of the embodiment of the shroud assembly shown in FIG. 7, further illustrating the features thereof.

FIGS. 7-8 illustrate an alternate embodiment of the shroud assembly 100' that includes a shroud 101'. More specifically, the shroud 101' includes a radially inner wall 102' having a radially inner surface 104', a radially outer surface 106', and a radial thickness 122 extending between the radially inner surface 104' and the radially outer surface 106'. The radially inner wall 102' is positioned in the first and second cavity portions 86(a), 86(b). In this respect, the radially outer surface 104' is adjacent to, but radially spaced apart from, the first and the second casing bosses 82(a), 82(b), and the radially inner surface 106' is adjacent to the turbine rotor blades 72(a). The radially inner surface 104' and the radially outer surface 106' are curved in the circumferential direction 94.

The radially inner wall 102' includes a central boss 118 extending radially outwardly from the radially outer surface 104' thereof. As best illustrated in FIG. 8, the central boss 118 may be triangular. In this respect, the central boss 118 circumferentially narrows in the radially outward direction. Although, the central boss 118 may have any suitable shape (e.g., rectangular, hemispherical, etc.) or combination of shapes (e.g., a rectangle with a triangular base).

The shroud 101' also includes a radially outer wall 108' having a radially inner surface 110', a radially outer surface 112', and a radial thickness 124 extending between the radially inner surface 110' and the radially outer surface 112'. An axially central portion of the radially inner surface 110' of the radially outer wall 108' integrally couples to the central boss 118. The axially outer ends of the radially outer wall 108' are positioned in the first and second slots 84($a$), 84($b$), which are sized to secure the radially outer wall 108' therein. The radially outer surface 112' contacts a radially inner surface 134 of the turbine casing 76 (FIG. 5). Like the radially inner wall 102', the radially outer wall 108' is planar in the axial direction 90 and curved in the circumferential direction 94. The radial thickness 122 of the radially inner wall 102' is preferably greater than the radial thickness 124 of the radially outer wall 108'. Although the radial thickness 122 may be less than or the same as the radial thickness 124.

The radially outer wall 108' may optionally include a first flange 120($a$) and a second flange 120($b$) circumferentially spaced apart from the first flange 120($a$). In particular, the first flange 120($a$) may be positioned on one circumferential end of the radially outer wall 108', and the second flange 120($b$) may be positioned on the other circumferential end of the radially outer wall 108'.

The radially inner wall 102' and the radially outer wall 108' collectively define a first cavity 114($a$)' and a second cavity 114($b$)' axially spaced apart from the first cavity 114($a$). The first and second casing bosses 82($a$), 82($b$) are positioned in the first and second cavities 114($a$)', 114($b$)'. Like the first and the second cavities 114($a$), 114($b$), the first and second cavities 114($a$)', 114($b$)' provide clearance for the radially inner wall 102' to move radially outer upon contact with one or more of the turbine blades 74($a$).

During operation of the turbofan 10, the shroud 101' moves radially outwardly upon contact with one or more of the turbine blades 74($a$). As with the shroud 101, this radial movement prevents erosion of the shroud 101' and/or the turbine blades 72($a$). More specifically, when one or more turbine blades 74($a$) contact the radially inner surface 104', the central boss 118 radially compresses, thereby moving the radially inner wall 102' radially outwardly toward the turbine casing 76. This minimizes the forces exerted by the one or more turbine blades 74($a$) on the radially inner wall 102', thereby preventing the aforementioned erosion. The radially spaced apart relationship between the radially outer surface 106' of the radially inner wall 102' and the first and second casing bosses 82($a$), 82($b$) provide clearance to accommodate the radial movement of the radially inner wall 102'. This radially outward movement also shrinks the cavities 114($a$)', 114($b$)'.

When the one or more turbine blades 72($a$) in contact with the radially inner wall 104' move out of contact therewith, the shroud 101' returns to its pre-contact configuration. More specifically, the radially outer wall 108' radially expands, thereby moving the radially inner wall 102' radially inwardly away from the turbine casing 76 and back to its pre-contact position. In this respect, the cavities 114($a$)', 114($b$)' also expand to their pre-contact sizes.

Figure 9:
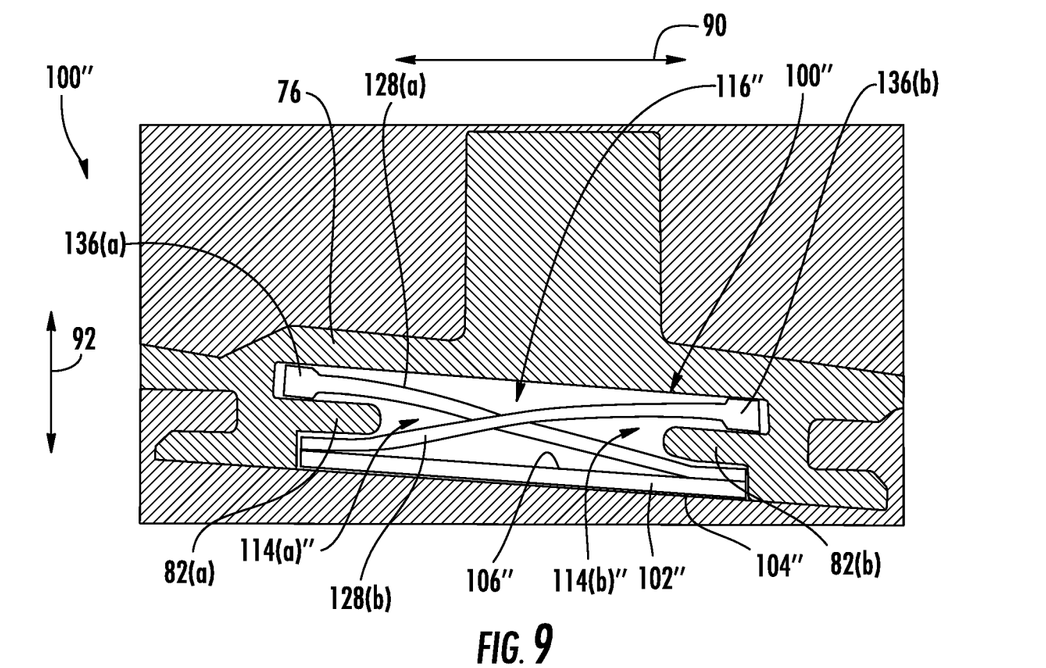
FIG. 9 is a cross-sectional front view of a further embodiment of the shroud assembly as disclosed herein.
Figure 10:
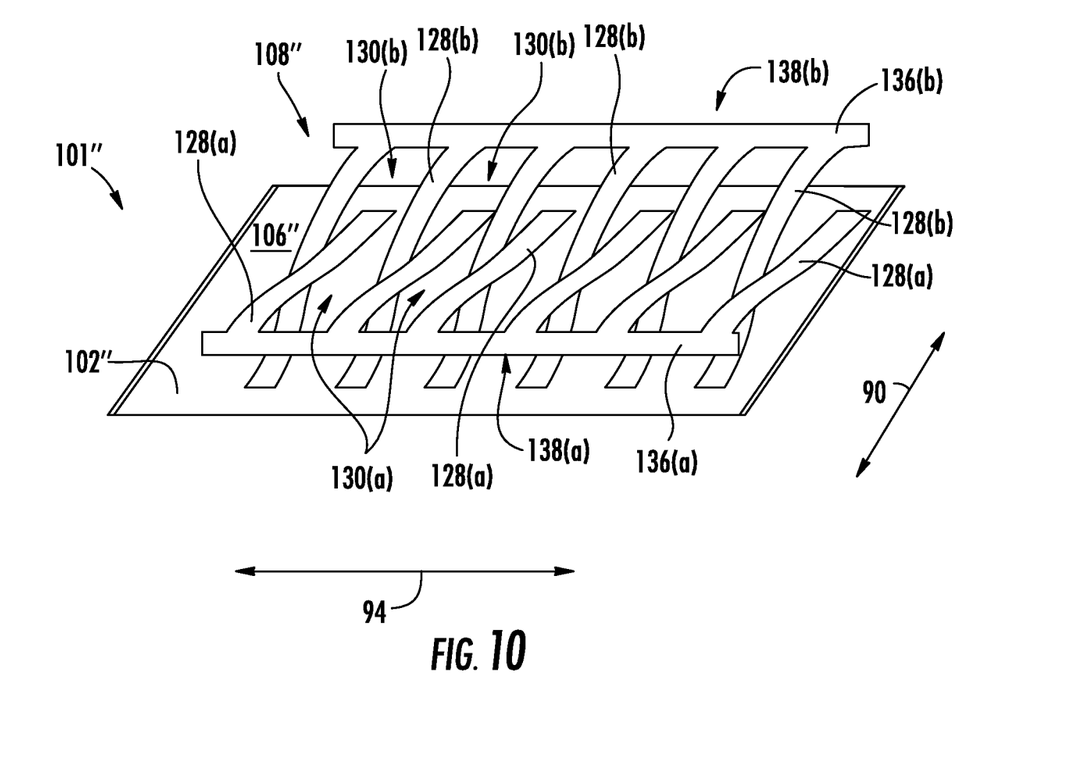
FIG. 10 is a perspective view of the embodiment of the shroud assembly shown in FIG. 9, further illustrating the features thereof.

FIGS. 9-10 illustrate a further alternate embodiment of the shroud assembly 100" that includes a shroud 101". More specifically, the shroud 101" includes a radially inner wall 102" having a radially inner surface 104" and a radially outer surface 106". The radially inner wall 102" is positioned in the first and second cavity portions 86($a$), 86($b$). In this respect, the radially outer surface 104" is adjacent to, but radially spaced apart from, the first and the second casing bosses 82($a$), 82($b$), and the radially inner surface 106" is adjacent to the turbine rotor blades 72($a$). The radially inner surface 104" and the radially outer surface 106" are planar in the axial direction 90 and curved in the circumferential direction 94.

The shroud 101" also includes a radially outer wall 108" having a first radially inner wall portion 138($a$) and a second radially inner wall portion 138($b$). The first inner wall portion 138($a$) includes a first flange 136($a$), and the second radially inner wall portions 138($b$) includes a second flange 136($b$). The first and the second flanges 136($a$), 136($b$) are axially spaced apart and radially aligned. Furthermore, the first and the second flanges 136($a$), 136($b$) are substantially longer in the circumferential direction 94 than in the axial direction 90 (e.g., ten times longer, twenty times longer, etc.). In this respect, the first and the second flanges 136($a$), 136($b$) are positioned in the first and second slots 84($a$), 84($b$), which are sized to secure the first and the second flanges 136($a$), 136($b$) therein.

The first and the second flanges 136($a$), 136($b$) respectively include a first plurality of circumferentially spaced apart fingers 128($a$) and a second plurality of circumferentially spaced apart fingers 128($b$). The first plurality of fingers 128($a$) defines a first plurality of slots 130($a$) between each adjacent pair of fingers 128($a$), and the second plurality of fingers 128($b$) defines a second plurality of slots 130($b$) between each adjacent pair of fingers 128($b$). Each of the first and the second pluralities of fingers 128($a$), 128($b$) respectively extend axially and radially inwardly from the first and the second flanges 136($a$), 136($b$) and couple to the radially outer surface 106" of the radially inner wall 102". As illustrated in FIGS. 9-10, the first plurality of fingers 128($a$) couples to the portion of the radially outer surface 106" positioned in the second cavity 86($b$). Similarly, the second plurality of fingers 128($b$) couples to the portion of the radially outer surface 106" positioned in the first cavity 86($a$). In this respect, each of the first plurality of fingers 128($a$) is positioned in one of the second plurality of slots 130($b$) formed by the second plurality of fingers 128($b$). Analogously, each of the second plurality of fingers 128($b$) is positioned in one of the first plurality of slots 130($a$) formed by the first plurality of fingers 128($a$). Each of the first and the second pluralities of fingers 128($a$), 128($b$) may straight or curved.

The first plurality of fingers 128($a$) and the second plurality of fingers 128($b$) collectively define a first cavity 114($a$)" and a second cavity 114($b$)" axially spaced apart from the first cavity 114($a$)". The first and second casing bosses 82($a$), 82($b$) are positioned in the first and second cavities 114($a$)", 114($b$)", which provide clearance for the radially inner wall 102" to move radially outwardly upon contact with one or more of the turbine blades 74($a$).

The first plurality of fingers 128($a$), the second plurality of fingers 128($b$), and the turbine casing 76 collectively define a cavity 116". The cavity 116" provides clearance for first plurality of fingers 128($a$) and the second plurality of fingers 128($b$) to move radially outward when one or more of the turbine blades 74($a$) contact the radially inner wall 102".

During operation of the turbofan 10, the shroud 101" moves radially outwardly upon contact with one or more of the turbine blades 74(a). This radial movement prevents erosion of the shroud 101 and/or the turbine blades 72(a). More specifically, when one or more turbine blades 74(a) contact the radially inner surface 104" of the radially inner wall 102", the first and the second pluralities of fingers 128(a), 128(b) pivot radially outwardly, thereby shrinking the cavity 116". This moves the radially inner wall 102" radially outwardly toward the turbine casing 76 to minimize the forces exerted thereon by the one or more turbine blades 74(a), thereby preventing the aforementioned erosion. The radially spaced apart relationship between the radially outer surface 106" of the radially inner wall 102" and the first and second casing bosses 82(a), 82(b) provide clearance to accommodate the radial movement of the radially inner wall 102". This radially outward movement also shrinks the cavities 114(a)", 114(b)".

When the one or more turbine blades 72(a) in contact with the radially inner wall 104" move out of contact therewith, the shroud 101" returns to its pre-contact configuration. More specifically, the first and the second pluralities of fingers 128(a), 128(b) pivot radially inwardly, thereby enlarging the cavity 116" to its pre-contact size. This moves the radially inner wall 102" radially inwardly away from the turbine casing 76 and back to its pre-contact position. In this respect, the cavities 114(a)", 114(b)" also expand to their pre-contact sizes.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A shroud assembly for a gas turbine, the gas turbine defining an axial centerline, a radial direction extending orthogonally outward from the axial centerline, and circumferential direction extending circumferentially around the axial centerline, the shroud assembly comprising:
    a casing defining first and second slots; and
    a shroud, comprising:
        a radially outer wall engaged with the casing, the radially outer wall including first and second axially outer ends that are received in the first and second slots, respectively, such that the axially outer ends are fixed relative to the casing; and
        a radially inner wall integrally coupled to the radially outer wall by a central boss, wherein the radially inner wall and the radially outer wall each partially define a pair of axially opposed cavities, and wherein the radially inner wall moves radially outward toward the casing when one or more gas turbine blades contact the radially inner wall; and
        wherein the radially inner wall and the radially outer wall are symmetric about a plane extending in the radial direction and the circumferential direction,
        wherein the first and second axially outer ends are coupled to the central boss, and
        wherein the central boss has a triangular cross-sectional shape.

2. The shroud assembly of claim 1, wherein the casing is a compressor casing or a turbine casing.

3. The shroud assembly of claim 1, wherein the casing comprises a pair of axially opposed bosses, and wherein each of the axially opposed bosses are positioned in one of the pair of axially opposed cavities.

4. The shroud assembly of claim 1, wherein the radially outer wall is axially planar and circumferentially curved.

5. The shroud assembly of claim 1, wherein the radially outer wall is axially arcuate-shaped.

6. The shroud assembly of claim 1, wherein the radially outer wall comprises a pair of rectangular flanges.

7. The shroud assembly of claim 1, wherein the radially inner wall moves radially inward away from the casing when the one or more gas turbine blades move out of contact with the radially inner wall.

8. The shroud assembly of claim 1, wherein the axially outer ends are at least partially aligned along the radial direction of the gas turbine.

9. A gas turbine defining an axial centerline, a radial direction extending orthogonally outward from the axial centerline, and circumferential direction extending circumferentially around the axial centerline, the gas turbine comprising:
    a compressor, comprising a compressor casing and a plurality of compressor blades, the compressor casing defining first and second compressor casing slots;
    a combustion section;
    a turbine, comprising a turbine casing and a plurality of turbine blades, the turbine casing defining first and second turbine casing slots;
    a shaft rotatably coupling the compressor and the turbine; and
    a shroud for the compressor or the turbine, the shroud comprising:
        a radially outer wall engaged with the compressor casing or the turbine casing, the radially outer wall including first and second axially outer ends that are received in the corresponding first and second compressor casing or turbine casing slots, respectively, such that the axially outer ends are fixed relative to the corresponding compressor or turbine casing; and
        a radially inner wall integrally coupled to the radially outer wall by a central boss, wherein the radially inner wall and the radially outer wall each partially define a pair of axially opposed cavities, and wherein the radially inner wall moves radially outward toward the compressor casing or the turbine casing when one or more of the plurality of compressor blades or the plurality of turbine blades contact the radially inner wall; and
        wherein the radially inner wall and the radially outer wall are symmetric about a plane extending in the radial direction and the circumferential direction,
        wherein the first and second axially outer ends are coupled to the central boss, and
        wherein the central boss has a triangular cross-sectional shape.

10. The gas turbine of claim 9, wherein the compressor casing or turbine casing comprises a pair of axially opposed bosses, and wherein each of the axially opposed bosses are positioned in one of the pair of axially opposed cavities.

11. The gas turbine of claim 9, wherein the radially outer wall is planar.

12. The gas turbine of claim 9, wherein the radially outer wall is axially arcuate-shaped.

13. The gas turbine of claim 9, wherein the radially inner wall moves radially inward away from the compressor casing or the turbine casing when one or more gas turbine blades move out of contact with the radially inner wall.

14. The gas turbine of claim 9, wherein the shroud comprises a plurality of axially-aligned and circumferentially spaced apart shrouds.

15. The gas turbine of claim 14, further comprising:
a seal positioned between each of the plurality of axially-aligned and circumferentially spaced apart shrouds.

16. The gas turbine of claim 14, wherein each of the radially inner walls of the plurality of axially-aligned and circumferentially spaced apart shrouds independently move radially outward when one or more of the plurality of compressor blades or the plurality of turbine blades contact the radially inner wall.

17. A shroud assembly for a gas turbine, the gas turbine defining a radial direction extending orthogonally outward from a longitudinal centerline of the gas turbine, the shroud assembly further defining a circumferential direction extending circumferentially around the longitudinal centerline, the shroud assembly comprising:
a casing; and
a shroud, comprising:
a radially outer wall, comprising:
a first flange engaged with the casing, the first flange comprising a first plurality of fingers;
a second flange engaged with the casing, the second flange comprising a second plurality of fingers, at least one finger of the second plurality of fingers having the same position along the circumferential direction as a portion of the first flange; and
a radially inner wall coupled to the first plurality of fingers and the second plurality of fingers and positioned radially inward from the first flange and the second flange, an axial position of the first flange being the same as an axial position where the second plurality of fingers connects to the radially inner wall,
wherein the radially outer wall and the radially inner wall collectively define a pair of axially opposed cavities, and
wherein the first plurality of fingers and the second plurality of fingers pivot radially outward to move the radially inner wall radially outward toward the casing when one or more gas turbine blades contact the radially inner wall.

18. The shroud assembly of claim 17, wherein the first plurality of fingers defines a plurality of slots, and wherein each of the second plurality of fingers is positioned in one of the plurality of slots.

* * * * *